Jan. 28, 1930.  E. BUGATTI  1,744,748
SAFETY DEVICE FOR BRAKES
Filed Dec. 30, 1927  2 Sheets-Sheet 1
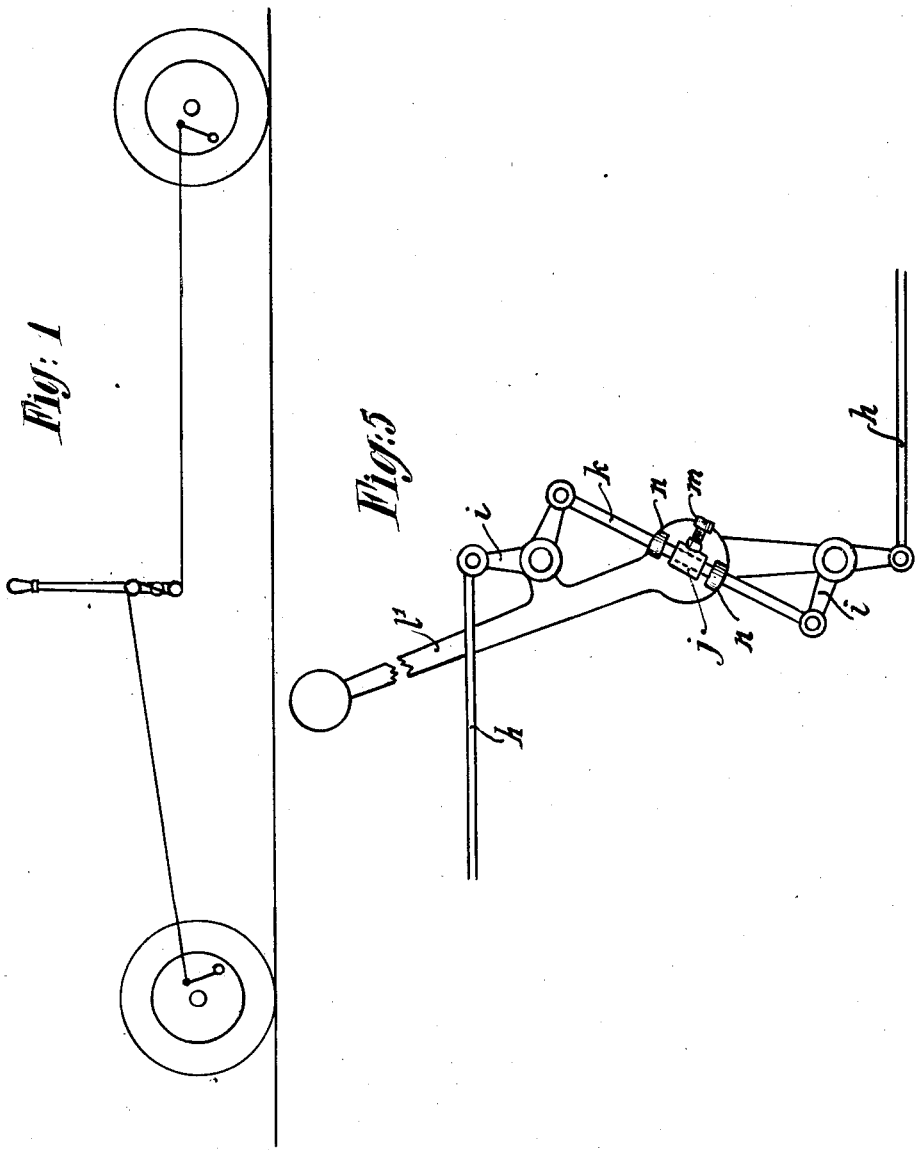
Inventor:
Ettore Bugatti,
by Mauro & Lewis
attorneys.

Jan. 28, 1930.  E. BUGATTI  1,744,748
SAFETY DEVICE FOR BRAKES
Filed Dec. 30, 1927   2 Sheets-Sheet 2
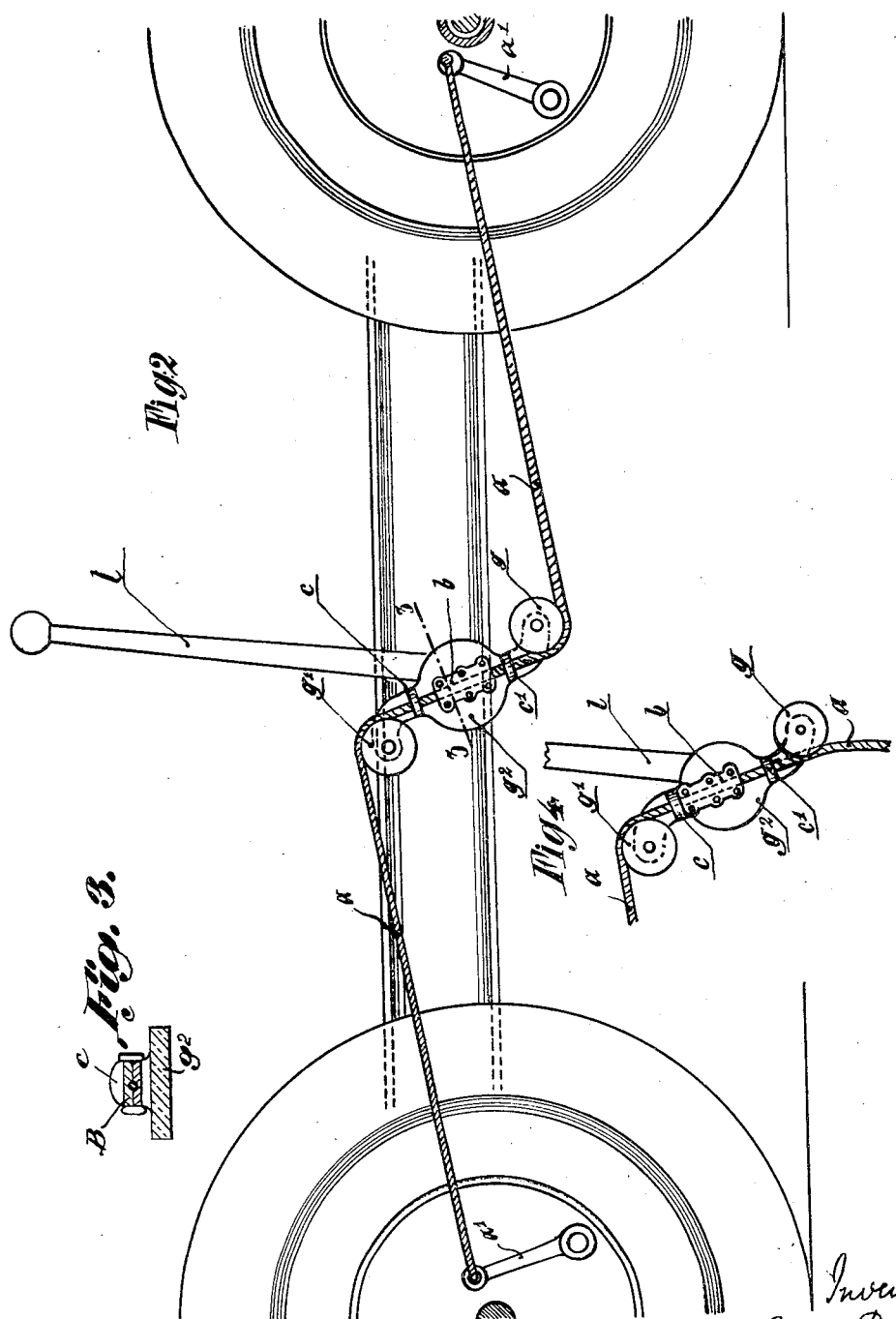

Patented Jan. 28, 1930

1,744,748

UNITED STATES PATENT OFFICE

ETTORE BUGATTI, OF MOLSHEIM, BAS-RHIN, FRANCE

SAFETY DEVICE FOR BRAKES

Application filed December 30, 1927, Serial No. 243,614, and in France January 7, 1927.

My invention relates to a safety device for use with brakes of the type which are controlled by means of cables or chains.

The objects of the invention will be readily discernible by those skilled in the art from the following description when taken in connection with the accompanying drawing forming part of this specification and in which—

Fig. 1 is a diagram illustrating the type of brake system to which the invention is applicable;

Fig. 2 is an elevational view of the safety device associated with a brake of the type shown in Fig. 1;

Fig. 3 is a section along the line 3—3 of Fig. 2;

Fig. 4 is a detail showing the position of the parts of the safety device during rupture of the cable; and Fig. 5 is an elevational view of a modified form of safety device for use with rigid brake rods.

As is well known in the art, front and rear brakes are frequently controlled by a continuous cable after the manner schematically set forth in Fig. 1.

This arrangement although efficient presents grave disadvantages. In case of rupture of the cable the brakes on one side become suddenly inoperative and the force applied to the brake lever or pedal which previously acted on the four wheels becomes annulled completely, not only on the side where rupture of the cable has occured but also with respect to the four wheels due to the action of the connecting rod or other compensating arrangement which normally balances the right and left hand brakes. Consequently, there being no braking resistance on the side where the cable has ruptured, the unbroken cable becomes slack and as a result also inoperative.

The safety device forming the subject matter of the present invention has for an object to remedy the disadvantages, above enumerated, by providing the cable with a collar disposed between two fixed stops or abutting members so that the collar, in case of rupture of the cable, is arrested by one or the other of the said abutting members and thus permit application of the brake on either the front or rear wheel on the side which the cable has ruptured.

The figures in the drawing only represent one side of the vehicle upon which the device is disposed, that is, the cross balancing rod between the right and left hand brakes is not shown, the operation thereof being assumed to be normal.

Referring to Figs. 2 to 4, a continuous brake control cable $a$ is attached at its extremities to the brake control levers $a'$ and passes over and under two pulleys $g$, $g^1$ mounted on the extremities of a two-armed lever $g^2$ fixed to a brake lever $l$ or other manually controlled element such as a brake pedal in certain cases. Fixed to the cable between the two pulleys $g$, $g^1$ is a collar $b$ of elongated form. The cable $a$ passes through two stops or abutment members $c$, $c^1$ carried by the lever $g^2$ and the said abutment members are so disposed with respect to the length of the collar $b$ that an interval exists between each of the said members and the respective extremity of the said collar in order to properly balance the cable as a result of loose play therein due to the unequal wearing of the front and rear brakes.

From the foregoing description it will be obvious to those skilled in the art that if the cable should break between the pulley $g$ and the control lever $a'$, the upper surface of the collar $b$ will come into contact with the stop $c$ (Fig. 4) and the cable will remain operatively connected to the front wheel brake and the braking of the said wheel will not be destroyed. If on the other hand the cable $a$ should break between the pulley $g^1$ and the control lever $a'$, the lower surface of the collar $b$ will come into contact with the stop $c^1$ and the cable $a$ will remain operatively connected to the rear wheel brake, which still makes possible the braking of the said rear wheel and of the two wheels on the opposite side of the vehicle due to the arrangement of the cross connecting rod or differential with which all vehicles having simultaneously acting four-wheel brakes are provided.

Fig. 5 shows the embodiment of Figs. 2 to 4 just described modified for use with rigid brake rods. As therein shown the brake rods $h$ are each connected to a compensating bell-crank lever $i$ which in turn is connected to a compensating connecting link $k$, the said levers $i$ being connected at each extremity of the link $k$. A collar $j$ is fastened to the link $k$ by means of a set screw $m$. The said link $k$ extends through two stops $n$ carried by a hand lever $l'$ as before. The operation of this embodiment is analogous to that previously described. If either of the rods $h$, the compensating levers $i$ or either outer portion of the link $k$ should become broken, the collar $j$ abuts against one of the stops $n$ and permits at least one of the front and rear wheel brakes to be applied as previously described.

Having thus described my invention what I claim as new and desire to secure by Letters Patent is—

1. In a brake control of the type described having front and rear wheel brake control levers and continuous flexible means interconnecting said levers, the combination of means for causing said flexible means to operate said levers simultaneously and means associated with said last mentioned means for assuring operation of at least one of said front control levers and one of said back control levers upon rupture of said flexible means.

2. In a brake control of the type described having front and rear wheel brake control levers and a continuous cable interconnecting said levers, the combination of means for causing said cable to operate said levers simultaneously and means associated with said first mentioned means for assuring operation of at least one of said front control levers and one of said back control levers upon rupture of said cable.

3. In a brake control of the type described having front and rear wheel brake control levers and a continuous cable interconnecting said levers, the combination of a pivotally mounted two-armed lever, a pulley carried by each arm of said lever and engaging said cable on opposite sides thereof and means associated with said cable between said pulleys for assuring operation of at least one of said front control levers and one of said back control levers upon rupture of said cable.

4. In a brake control of the type described having front and rear wheel brake control levers and a continuous cable interconnecting said levers, the combination of a pivotally mounted two-armed lever, a pulley carried by each arm of said lever and engaging said cable on opposite sides thereof, a pair of stops carried by said two-armed lever and loosely engaging said cable and a collar fixed to said cable between said stops for the purpose set forth.

5. In a brake control of the type described having front and rear wheel brake control levers and a continuous cable interconnecting said levers, the combination of a pivotally mounted two-armed lever, a pulley carried by each arm of said lever and engaging said cable on opposite sides thereof, a pair of stops carried by said two-armed lever and loosely engaging said cable and a collar fixed to said cable between said stops, the length of said collar being shorter than the distance between said stops for the purpose set forth.

In testimony whereof I have signed this specification.

ETTORE BUGATTI.